(12) United States Patent
Srinivasan et al.

(10) Patent No.: US 7,617,289 B2
(45) Date of Patent: Nov. 10, 2009

(54) SYSTEM AND METHOD FOR USING A DATA REPLICATION SERVICE TO MANAGE A CONFIGURATION REPOSITORY

(75) Inventors: Ananthan Srinivasan, San Francisco, CA (US); Reto Kramer, San Francisco, CA (US); Dean B. Jacobs, Berkeley, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 853 days.

(21) Appl. No.: 10/371,247

(22) Filed: Feb. 20, 2003

(65) Prior Publication Data
US 2004/0025079 A1    Feb. 5, 2004

Related U.S. Application Data

(60) Provisional application No. 60/359,063, filed on Feb. 22, 2002.

(51) Int. Cl.
*G06F 15/16* (2006.01)

(52) U.S. Cl. .................. 709/209; 709/203; 709/208; 709/211; 709/220; 709/223; 709/224; 709/248; 714/15; 707/203

(58) Field of Classification Search .............. 709/208, 709/209, 203, 211, 220, 223, 224, 248; 707/203, 707/200, 100; 714/15, 16
See application file for complete search history.

(56) References Cited

U.S. PATENT DOCUMENTS

| | | | | |
|---|---|---|---|---|
| 5,434,994 | A | 7/1995 | Shaheen et al. | 395/500 |
| 5,613,060 | A * | 3/1997 | Britton et al. | 714/15 |
| 5,765,171 | A * | 6/1998 | Gehani et al. | 707/203 |
| 5,796,934 | A | 8/1998 | Bhanot et al. | 395/182.02 |
| 5,909,689 | A * | 6/1999 | Van Ryzin | 707/203 |
| 5,920,867 | A | 7/1999 | Van Huben et al. | 707/101 |
| 6,018,805 | A | 1/2000 | Ma et al. | |
| 6,044,367 | A | 3/2000 | Wolff | 707/2 |
| 6,088,694 | A | 7/2000 | Burns et al. | 707/8 |
| 6,112,304 | A | 8/2000 | Clawson | 713/156 |
| 6,122,629 | A | 9/2000 | Walker et al. | |
| 6,134,673 | A | 10/2000 | Chrabaszcz | |
| 6,236,999 | B1 | 5/2001 | Jacobs et al. | 707/10 |
| 6,263,372 | B1 | 7/2001 | Hogan et al. | 709/237 |
| 6,304,882 | B1 | 10/2001 | Strellis et al. | 707/202 |

(Continued)

OTHER PUBLICATIONS

Kooijmans, Enterprise JavaBeans for z/OS and OS/390 WebSphere Application Server V4.0, 2001, p. 31-78, 185-240.

(Continued)

*Primary Examiner*—Ario Etienne
*Assistant Examiner*—Barbara N Burgess
(74) *Attorney, Agent, or Firm*—Fliesler Meyer LLP

(57) ABSTRACT

A mechanism for making changes consistently across an application server domain or a cluster. Server configuration consistency is absolutely necessary for cluster deployments. The invention allows changes to the configuration repository and to the application deployment process to be managed via a Data Replication Service (DRS). The former requires that the configuration repository be version aware, while the latter breaks down the application deployment process into two phases—one for data distribution and processing as far as possible, and the second to expose the changes through the Java Naming and Directory Interface (JNDI).

17 Claims, 1 Drawing Sheet

U.S. PATENT DOCUMENTS

| | | | |
|---|---|---|---|
| 6,345,288 B1 | 2/2002 | Reed et al. | |
| 6,351,775 B1 | 2/2002 | Yu | 709/238 |
| 6,389,462 B1 | 5/2002 | Cohen et al. | |
| 6,405,219 B2 | 6/2002 | Saether et al. | |
| 6,425,005 B1 | 7/2002 | Dugan et al. | |
| 6,438,705 B1 | 8/2002 | Chao et al. | |
| 6,477,150 B1 | 11/2002 | Maggenti et al. | 370/312 |
| 6,484,143 B1 | 11/2002 | Swildens et al. | 705/1 |
| 6,505,200 B1 | 1/2003 | Ims et al. | 707/8 |
| 6,505,241 B2 | 1/2003 | Pitts | |
| 6,523,130 B1 | 2/2003 | Hickman et al. | |
| 6,526,521 B1 | 2/2003 | Lim | 714/4 |
| 6,539,381 B1 | 3/2003 | Prasad et al. | 707/10 |
| 6,571,274 B1 | 5/2003 | Jacobs et al. | 709/203 |
| 6,581,088 B1 | 6/2003 | Jacobs et al. | 709/105 |
| 6,757,708 B1 | 6/2004 | Craig et al. | 709/203 |
| 6,775,703 B1 | 8/2004 | Burns et al. | |
| 6,826,601 B2 | 11/2004 | Jacobs et al. | |
| 6,877,111 B2 | 4/2005 | Sharma et al. | 714/13 |
| 6,944,785 B2 | 9/2005 | Gadir et al. | |
| 2001/0042073 A1* | 11/2001 | Saether et al. | 707/203 |
| 2001/0054062 A1 | 12/2001 | Ismael et al. | |
| 2002/0073188 A1 | 6/2002 | Rawson, III | |
| 2002/0147961 A1 | 10/2002 | Charters et al. | |
| 2002/0161839 A1 | 10/2002 | Colasurdo et al. | |
| 2002/0188591 A1 | 12/2002 | Santosuosso | |
| 2002/0188613 A1* | 12/2002 | Chakraborty et al. | 707/100 |
| 2003/0014532 A1 | 1/2003 | Chang et al. | |
| 2003/0018732 A1 | 1/2003 | Jacobs et al. | |
| 2003/0023898 A1 | 1/2003 | Jacobs et al. | |
| 2003/0041135 A1 | 2/2003 | Keyes et al. | |
| 2003/0060214 A1 | 3/2003 | Hendrey et al. | |
| 2003/0061323 A1* | 3/2003 | East et al. | 709/223 |
| 2003/0088713 A1 | 5/2003 | Mandal et al. | |
| 2003/0233433 A1 | 12/2003 | Halpern | |
| 2003/0236923 A1 | 12/2003 | Jeyaraman et al. | |
| 2004/0059735 A1 | 3/2004 | Gold et al. | |
| 2004/0139125 A1 | 7/2004 | Strassburg et al. | |
| 2004/0153558 A1 | 8/2004 | Gundue et al. | |
| 2004/0230747 A1 | 11/2004 | Ims et al. | |
| 2006/0168118 A1 | 7/2006 | Godlin et al. | |
| 2006/0212453 A1 | 9/2006 | Eshel et al. | |

OTHER PUBLICATIONS

Bainbridge, "CICS and Enterprise JavaBeans", 2001, v.40, No. 1, p. 1-19.

"Achieving Scalability and High Availability for E-Commerce and Other Web Applications," BEA Systems, Inc., Jun. 15, 1999.

BEA WebLogic Server Version 6.0 Data Sheet, BEA Systems, Inc., Dec. 17, 2000.

BEA WebLogic Server Version 6.1 Data Sheet, BEA Systems, Inc., May 30, 2001.

Stearns, "Using the J2EE Connector Architecture Common Client Interface", Sun, Apr. 2001, pp. 1-10.

Marinescu "BEA Weblogic Server 6.1 has been released", TheServerSide.com, Jul. 31, 2001, p. 1.

Flowers, "The J2EE Connector Architecture", Sys-Con Media, May 1, 2001, pp. 1-4.

Rana et al., "Java Junction", Intelligent Enterprise, Apr. 16, 2001, pp. 1-9.

Stanhope, "J2EE Connector Architecture Promises to Simplify Connection to Back-End Systems", Giga Information Group, Nov. 16, 2000, pp. 1-4.

Sarathy, et al., "Integrating Java Applications with the Enterprise", EAI Journal, May 2001, pp. 50-54.

BEA Systems, Inc., WebLogic Server 6.1, Sep. 19, 2001, 36 pages.

Rodoni, "The J2EE Connector Architecture's Resources Adapter", Sun, Dec. 2001, pp. 1-12.

Visveswaran, "Dive Into Connection Polling with J2EE", Sun, Oct. 2000, pp. 1-7.

Abdallah, M. et al., One-phase Commit: Does It Make Sense?, Dec. 14-16, 1998, Proceedings of International Conference on Parallel and Distributed Systems, 1998, pp. 182-192.

* cited by examiner

SYSTEM AND METHOD FOR USING A DATA REPLICATION SERVICE TO MANAGE A CONFIGURATION REPOSITORY

CLAIM OF PRIORITY

This application claims priority from provisional application "SYSTEM AND METHOD FOR USING A DATA REPLICATION SERVICE TO MANAGE A CONFIGURATION REPOSITORY " Application No. 60/359,063 filed Feb. 22, 2002, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to a system and method for using a data replication service to manage a server configuration.

CROSS-REFERENCES

This application is related to co-pending applications, U.S. Provisional Patent Application entitled DATA REPLICATION PROTOCOL, Inventors Dean Bernard Jacobs, Reto Kramer and Ananthan Srinivasan, Application No. 60/305,986, filed Jul. 16, 2001, U.S. Provisional Patent Application entitled LAYERED ARCHITECTURE FOR DATA REPLICATION, Inventors Dean Bernard Jacobs, Reto Kramer and Ananthan Srinivasan, Application No. 60/305,978, filed Jul. 16, 2001, U.S. patent application entitled DATA REPLICATION PROTOCOL, Inventors Dean Bernard Jacobs, Reto Kramer and Ananthan Srinivasan , application Ser. No. 09/975,590, filed Oct. 11, 2001, and U.S. patent application entitled LAYERED ARCHITECTURE FOR DATA REPLICATION, Inventors Dean Bernard Jacobs, Reto Kramer and Ananthan Srinivasan, application Ser. No. 09/975,587, filed Oct. 11, 2001, which applications are incorporated herein by reference.

BACKGROUND

In a clustered or distributed application server domain environment, some form of data replication is useful in order to distribute configuration and deployment information from an administration (Admin) server to the managed servers within its domain. The typical requirements for such a data replication process is to be able to distribute large data items over point-to-point connections (TCP), that provides for a measure of flow control. Data replication allows managed servers to persistently cache data on local disks, and speeds server startup by reducing the amount of data to be transferred. Storing data locally on each server also allows independent server startup and/or restart when the Admin server is unavailable, unreachable, or in a failed condition.

Besides a simple copying of data from one machine to another, updates and changes to the domain configuration repository need to be distributed to the servers to which the changes are applicable in a manner that maintains the consistency of configuration of the domain. Some changes need to be consistent across the entire domain while others need to be consistent within clusters. Consistency is also crucial to the application deployment and redeployment process. This is because services like availability, failover, load-balancing & in-memory replication are scoped to a cluster and not the entire domain.

SUMMARY

Data Replication Services (DRS) provides a mechanism for making changes consistently across a WebLogic domain or a cluster. Consistency is absolutely necessary for cluster deployments. It is in this context that DRS excels. The invention allows changes to the configuration repository and the application deployment process to be managed via DRS. The former requires that the configuration repository be version aware while the latter breaks down the application deployment process into two phases—one for data distribution and processing as far as possible and the second to expose the changes through JNDI. Features of DRS-based configuration management in accordance with the invention may include:

Package updates as incremental deltas between versions.

Provision for two distribution methods.

One-phase Servers can commit to new data as soon as it is received.

Two-phase Prepare and commit phases with the possibility of abort.

Ability to ensure a temporarily unavailable server eventually receives all updates.

To ensure consistency and to ensure that an application & its modules that are deployed in a cluster are advertised in JNDI only after all the required class files are available, application deployment is staged in two phase using DRS two-phase updates.

DETAILED DESCRIPTION

Figure 1:
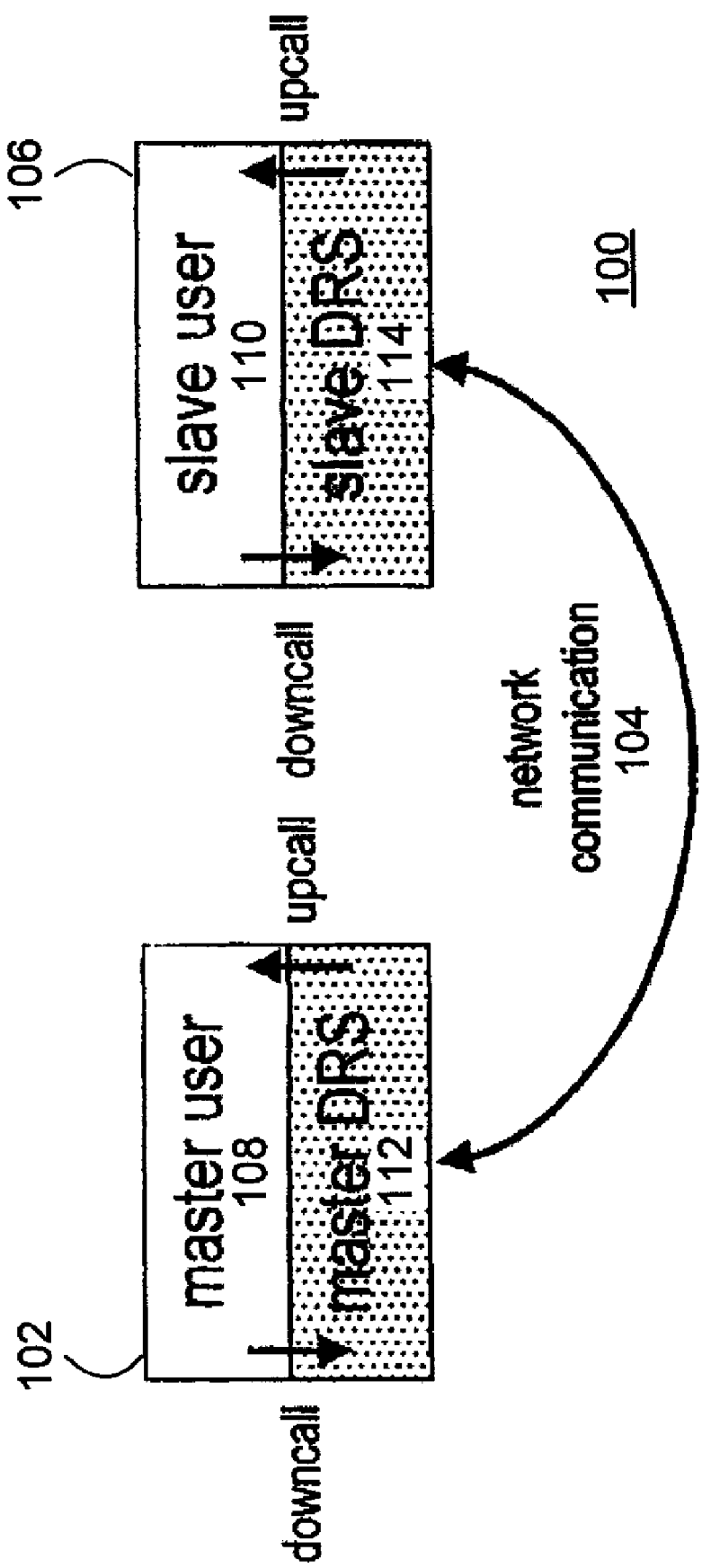
FIG. 1 shows an illustration of a bilateral DRS protocol.

The Data Replication Service described in further detail in copending application U.S. Provisional Patent Application entitled DATA REPLICATION PROTOCOL, Inventors Dean Bernard Jacobs, Reto Kramer and Ananthan Srinivasan, Application No. 60/305,986, filed Jul. 16, 2001, U.S. Provisional Patent Application entitled LAYERED ARCHITECTURE FOR DATA REPLICATION, Inventors Dean Bernard Jacobs, Reto Kramer and Ananthan Srinivasan, Application No. 60/305,978, filed Jul. 16, 2001, U.S. patent application entitled DATA REPLICATION PROTOCOL, Inventors Dean Bernard Jacobs, Reto Kramer and Ananthan Srinivasan, application Ser. No. 09/975,590, filed Oct. 11, 2001, and U.S. patent application entitled LAYERED ARCHITECTURE FOR DATA REPLICATION, Inventors Dean Bernard Jacobs, Reto Kramer and Ananthan Srinivasan, application Ser. No. 09/975,587, filed Oct. 11, 2001, which applications are incorporated herein by reference, provides a mechanism to distribute consistency-sensitive shared data and information to servers in an application server domain, such as, for example, a WebLogic domain. Typically the data is under the responsibility of one of the servers [Admin server] and needs to be distributed to and updated in the other servers in the cluster with near-transactional guarantees. This means that the data is either distributed and updated in all the relevant servers, or not updated on any server at all.

1. DRS Usage in Operations, Administration & Management [OA&M]

One of the primary candidates that can take advantage of the DRS is the management of configuration repository of an active server domain. Updates and changes to the configuration repository need to be distributed to the servers to which the changes are applicable in a manner that maintains the consistency of configuration of the domain. Some changes need to be consistent across the entire domain [security configuration] while others need to be consistent within clusters [non-security configuration data]

Another candidate that can use the DRS is the Application deployment and redeployment process. Here, consistency is more crucial at the scope of a cluster rather than the entire domain. This is because services like availability, failover, load-balancing & in-memory replication that are the desirable for any application are services that are scoped to a cluster and not the entire domain. To ensure consistency and to ensure that an application & its modules that are deployed in a cluster are advertised in JNDI only after all the required class files are available, application deployment is staged in two phase using DRS two-phase updates.

The invention allows the SysAdmin/OA&M framework to use the DRS to provide consistency of non-security configuration across any cluster in a domain as well as to provide consistency in application deployment and redeployment. Following a discussion below of the features provided by DRS in maintaining consistency, the usage of DRS for non-security configuration data management and for application deployment and redeployment is discussed.

FIG. 1 shows an illustration 100 of a bilateral DRS protocol. As shown in FIG. 1, a data item managed by the DRS has its copy of record at a single server, the master 102, where all updates occur. Deltas are propagated 104 to a set of other servers, the slaves 106. There are two layers within masters and slaves users:

The user 108, 110 of the DRS service, such as OA&M DRS.

The implementation 112, 114 of the service.

The DRS protocol is bilateral in that, in different circumstances, a master or a slave may take the initiative. A slave may pull a delta from the master during:

Domain startup.

One-phase distribution.

Recovery from exceptional circumstances.

Deltas may be between arbitrary versions of the data. The master pushes a delta to a slave during two-phase distribution. Such deltas are always between successive versions of the data.

2. Configuration Consistency

A number of factors affect the consistency of configuration of a server domain. Among these are: divergence caused by incomplete updates i.e. updates from the Admin server that have been successfully handled by some servers and are pending or have failed on some other servers in the domain. Without taking some steps to manage these updates, a managed server that is either unresponsive or temporarily partitioned from the network will find itself out-of-sync with the initiator of the updates. Another factor is whether configuration consistency needs to be preserved across servers in the domain or across servers in a cluster. An additional factor is the support for Managed Server Independence (MSI) where a server that cannot contact an Admin server during its boot process uses a locally persisted cache of the configuration. The DRS has a couple of patterns of message exchange that facilitate in achieving consistency.

DRS Two-phase Updates

DRS two-phase updates achieve a change in configuration in two phases. The first phase involves the pushing out of the change intention to all the managed servers in domain. This is the 'prepare' phase. In response to the 'prepare' request, the managed servers attempt to do all that is necessary to consume the change and respond back to the Admin server that initiated the change with an ACK or NAK. When the Admin server has received an ACK or a NAK from all the managed servers, it proceeds to the next stage. If all servers respond with an ACK, the Admin server sends out a 'commit' to the managed servers to finalize the change. If the Admin server receives a NAK from any managed server or if it has not received a response within a timeout period, it sends out an abort call to the managed servers. This results in the change to the configuration not being accepted on any server. Note that the consistency provided by this two phase update is less stringent than true transactional consistency. This is because there are windows in time wherein the configuration across the cluster and domain can be temporarily out of sync.

DRS Heartbeats

DRS also broadcasts heartbeats that contain the current version of the configuration repository to the servers in the entire domain. This provides a means for an out of sync managed server to catch up with the latest version. The DRS heartbeats, in addition to raising an alert when a configuration update only completes partially that requires the intervention of a system administrator for resolution can ensure that servers in a domain converge to and maintain a consistent configuration.

Consistency Across a Cluster and Across a Domain

DRS can be used to provide convergent consistency of data distribution across a cluster as well as across a domain. Since a domain is a larger entity than a cluster, convergence of consistency typically takes a longer period than it does for a cluster. Any configuration update using the DRS that requires domain wide consistency has to be able to tolerate relatively longer periods of temporary inconsistencies across servers in the domain.

One example of configuration that needs to be consistent across the domain is security data. Using DRS to coordinate security updates may give rise to periods during which the information may not be consistent across the entire domain. For any security related information that cannot tolerate this period of inconsistency, alternate means of distributing and updating security information needs to be provided. An example of such a system is an LDAP based security management.

Though security configuration needs to be consistent across the domain, there are currently no patterns of user request handling that spans clusters. For example—there is no failover from a server in a cluster to one that is outside the cluster and there is no maintenance of any machinery that facilitates in-memory replication spanning servers in a cluster and those outside it. As a result of these usage patterns, consistency across domains affects a working domain less than consistency across a cluster.

Non-security related configuration consistency however has a lower scope of coupling and does not need to be consistent at any given moment across the entire domain. It, however, needs to be consistent at the scope of a cluster for the correct functioning of any service that is available and that is targeted to a cluster. Examples of such services are Migratable services as well as any feature that relies on cluster services like in-memory replication upon which a lot of application functionality is based on. Hence application deployment needs to be consistent across clusters.

Role of Multicast in Achieving Consistency

A contributing factor to the shorter convergence period in a cluster is the fact that clusters can take advantage of the multicast infrastructure that they share to push out information quickly. Since application servers such as WebLogic typically do not have domain wide multicast infrastructure, intra domain communication is necessarily point-to-point where intra-cluster communication can be one-to-many using a server in the cluster that acts as a forwarder of all domain traffic to the rest of the cluster using multicasting.

Managed Server Independence and Configuration Consistency

The domain wide DRS heartbeats also allows the invention to overcome another potential source of divergence of configuration data managed server independence [MSI]. In providing MSI, managed servers can be started up with a locally persisted configuration when the managed server is not able to contact the Admin server for its configuration. This could be as a result of the Admin server being inactive or due to temporary partitioning of the network. A similar divergence can be introduced if a running managed server misses a configuration update from the Admin server as a result of being partitioned from the network on account of high loads or network failures. Since DRS heartbeats carry information on the latest version of the configuration, the managed servers can again determine that they are out-of-sync and subsequently attempt to get up to date.

A managed server will not receive any DRS heartbeats if the Admin server is not active. If the managed server is not part of a cluster, it will continue to be out-of-sync till the Admin server is up and is broadcasting DRS heartbeats. If the managed server is part of a cluster, it needs an alternate way to determine if its configuration is up to date. To address this scenario, cluster heartbeats also contain the latest configuration information. When such a managed server starts up in the absence of an Admin server, it will have to wait to receive a cluster heartbeat, ensure that it is up to date before completing its start up process that includes joining the cluster. If it determine that it is out of sync, it will have to wait till the Admin server is up to enable it to update its configuration before completing its start up process.

3. Configuration Management Using DRS

The configuration repository for a server domain, such as for example a WebLogic domain, commonly comprises a configuration file, or "config.xml" file, in addition to Security related data [certificates, salt files, etc]. The Admin server is the ultimate and final authority in the maintenance and management of configuration changes for the domain. The current scheme of management of configuration fails to provide adequate quality of service guarantees in maintaining consistency during the propagation of configuration changes across the Managed servers of a cluster or a domain. Cluster configuration needs to be consistent across the entire cluster in being able to successfully provide Migratable services [a.k.a. the Exactly Once Services]. However, while making changes to the cluster configuration, traditional mechanisms provide no means of maintaining consistency by enforcing the guarantee that when a change is made, either all servers in the cluster make that change successfully or none of them make any changes to their respective configurations.

Versioning the Configuration Repository

In accordance with the invention, to facilitate consistency of configuration, one of the first requirements on the configuration repository is that it needs to be version aware. This enables easy detection of configuration skew and taking of appropriate steps to correct that. As part of this version awareness, the version information of the repository needs to be persisted as part of the meta data of the repository. Further, any changes to the configuration will also result in the updating of the version information The format of the versioning information can be either a long integer or a more complex message digest or hash of the contents of the configuration repository. Which of these two to use is determined by the kinds of changes that typically affect the configuration, the propagation of that change and the resolution of that change on the receiving servers.

Configuration Change Types

The requirements on the version information for the configuration repository are:

a. It has to be long-lived for each version of the configuration data.

b. It has to be unique for each update attempt: the version of an aborted 2phase update should not be reused.

c. The Admin server should be able to generate a delta/diff between any two versions. If this is not possible, the latest version is returned.

Given these requirements on the version information of the configuration repository and given that the format of the configuration repository is an XML file, we can now look at the kinds of changes to the configuration repository.

Attribute Value Updates

The most frequent kind of update to the configuration repository is in the form of an update to an attribute of a configuration element. This is typically represented as an AttributeChange within the JMX framework and can result in AttributeChangeNotifications. The Admin server makes this change to the configuration repository and fires off AttributeChangeNotifications. The listeners of these changes that live in the MbeanServers running on the various Managed servers receive the notifications and make the appropriate changes to the relevant local Mbean attributes. By using DRS for AttributeChangeNotifications, attribute changes can be propagated to the recipient servers in a consistent manner.

Not all attribute notifications need to use DRS two-phase updates. Only attributes whose values need to be consistent within a cluster need to use the two-phase updates. All other updates can use one-phase updates. This is very similar to the existing RMI based notification scheme. The primary difference is that the notification is handled by DRS and thus will take advantage of multicast where appropriate. The attributes that require two-phase updates are:

a. ServerMBean.expectedToRun( ), b. MigratableTargets.Servers( ), and, c. MigratableTargets.ActiveServer( ).

Updates to these attributes need to be coordinated such that all active servers in a cluster are in agreement as to the values of these attribute values. To flag these attributes for two-phase updating, their meta information [tags] can be augmented with a "requires2phaseUpdate" string element. This information is used by the Mbean compiler to generate the necessary code to tie into the DRS two-phase update interfaces.

Adding New Configuration Elements/Removing Configuration Elements

This scenario occurs when a new configuration element is added to an existing configuration repository or when a configuration element is removed from an existing repository. This encompasses the tasks of configuration a new resource [JDBC driver, connection pool, JCA resource, JMS server/ destination etc.] or the removal of a resource. The corresponding JMX related Mbean calls to affect these are createAdminMBean( ), deleteMBean( ) respectively. For all such additions/deletions that are part of Application deployment/redeployment/undeployment, everything is coordinated by the OA&M framework that provides the application deployment functionality.

Configuration Change Format

Each change to the configuration repository has to be propagated to the relevant servers in the domain and needs to contain the following information:
fromVersionId, toVersionId, delta where 'fromVersionId' & 'toVersionId' are the old and new versions of the configuration repository and 'delta' describes the change that is required to transition from 'fromVersionId' to 'toVersionId'.

For attribute changes, 'delta' is in the form of a "attributeName=newValue" name/value pair. Where necessary, a scoping element may be added to this basic structure to provide further details of the place in the DOM tree of the configuration repository to which this change applies.

For new elements, 'delta' is in the form of a DOM tree snippet. A scoping element specifying the place where this change applies is also present. For elements that are to be deleted, the name of the element as well as the scope is specified based on which the element to be removed can be located in the DOM tree of the configuration repository. Note that these can be unchanged from the current scheme as it applies to changes in the form of new Mbeans being added to the configuration and Mbeans being deleted. The only requirement of the 'delta' and the version id's are that they be serializable so that they can be transported across a network.

Configuration Repository Version Id Format

The choice for the format of the version id of the configuration repository as mentioned earlier is one of a long integer or a message digest or hash of the configuration repository contents.

While a message digest may be a convenient indicator of the contents of the repository, it poses some challenges in the generation of changes from version to version as well as in the size necessary to capture the details of the contents. Further, for a message digest based scheme to work for a repository like the configuration repository with a tree/graph structure where both the tree as well as the nodes in the tree can change, it should be an 'index' based form, which in one embodiment may be similar to the HTTP based Data Replication Protocol.

This format captures each node as the message digest of its contents and its index captures the relationship between the various nodes of the tree. In this case, this would imply a message digest of all the Mbeans in a configuration repository. This would very quickly result in the index to be a fairly sizable structure of the order of several thousands of bytes. Since an object of the invention is to include the version id of the configuration repository in DRS heartbeats, this structure is not suitable. Something that is smaller and lends to easy generation of the differences is required. The version id as a long integer satisfies this requirement. Hence that can be used for the versioning of the configuration repository.

Change Management and Application

To facilitate any out of date Managed servers to get up to date with the configuration repository on the Ad min server, the Ad min server keeps track of the evolution of the configuration repository by keeping a list [version id X, delta X, Scope X] of change tuples up to and including the current version. These tuples satisfy the relationship:

VersionId N=Delta N applied to VersionID N−1 and applicable to the set of servers that belong to Scope X.

To avoid this tuple list from growing without bounds, the list extends backwards from the current version to the version that is last known to have been successfully applied to all relevant servers in the domain.

When an out of date Managed server attempts to catch up with the current version of the configuration repository, it will be served a list of change tuples from its persistent repository version to either the desired or the current version of the repository. A ConfigSlaveCoordinator on the Managed server takes this list and performs a series of updates to the configuration repository to enable it to get up to date.

In applying all two-phase updates, the receiving Managed server attempts to go as far as possible in the application of the change, except for the required step to expose the change as part of the first (or prepare) phase. The change is exposed upon receipt of a follow up second message (or commit). For attribute changes, this means that the prepare phase does not do anything and that the change will be applied to the appropriate Mbean in the commit phase. For changes involving addition or deletion of Mbeans, a flag indicating that a bean is valid is used. This flag indicates that an Mbean is invalid during the prepare phase. The commit phase changes this to valid after which the Mbean can be used. For deletion of an Mbean, nothing is done as part of the prepare phase and the flag is set to invalid as part of the commit phase. Thereafter, the invalidated Mbean is removed from the runtime image of the configuration repository. For redeployed entities, a shadow Mbean is created as part of the prepare phase and its flag is set to invalid. The changes are applied to the extent possible as part of the prepare phase. Upon a commit, the existing Mbean for the entity is marked invalid and the shadow Mbean is marked valid, and is used subsequently.

Change Propagation

Changes to the configuration repository can be propagated using any of a variety of messaging patterns that are currently available in the OA&M framework, some of which are listed below, together with a summary as to which if any should be altered to support configuration consistency.

HTTP Based BootServlet

The Managed server boots up by getting the initial set of Mbeans to enable it to start via the BootServlet, so it need not use DRS.

HTTP Based FileDistributionServlet

Application deployment triggers Managed servers to use the FileDistributionServlet to retrieve the appropriate files needed to complete the deployment, so it need not use DRS.

RMI Based Creation/Addition/Deletion of Admin Mbeans

Where this change needs to be made consistently across a cluster, DRS can be used. Whenever an Admin Mbean is created/deleted, DRS can be used to push out the Mbean and associated information in a controlled manner to all the relevant MbeanServers. The DRS two-phase update is used to distribute the information to ensure that the change is consistently distributed to clusters.

RMI Based Notification of Updates to Configuration Attributes

Notifications are used to handle updates to attributes of configuration elements. Apart from those attributes that need to be consistent across a cluster, all others can be updated using the existing RMI based scheme or by using DRS one-phase updates after ensuring that necessary changes to the version id of the configuration repository have been taken care of. For updates to attributes that need to be distributed in a consistent manner within a cluster, DRS two-phase updates can be used.

The use of the JMX NotificationBroadcaster and NotificationListener is spread through the OA&M framework. A new type of NotificationListener & NotificationBroadcaster that derives from the JMX ones will be created. These in turn will take care of the distribution of the updates through DRS. Not all NotificationBroadcasters/NotificationListeners that are currently used need to be changed—just the ones that cause configuration updates.

RMI Based One way Notification—Used in Implementing Logging.

RMI based One way Notification, as used in implementing logging will continue to use one way RMI, so DRS need not be used.

RMI Based Caching Stubs.

The caching stubs listen for attribute change notification events for the various attributes that are part of the delegate configuration Mbean. In response to the change events, each attribute marks itself as stale. Thereafter any attempt to look up an attribute results in the call being made through the delegate. The returned value is then cached. Again, DRS need not be used.

4. Application Deployment Using DRS

A significant motivation for the development of DRS is the need for a mechanism to ensure that class files that are part of a deployment are available at target Managed servers before the receipt of any JNDI announcements that are part of the application deployment. This is particularly critical in clustered configurations. To facilitate this, deployment of applications can be carried out using DRS two-phase updates.

The first phase of the update [the 'prepare' phase] comprises of the distribution of information regarding a deployment from an Admin server, the processing of this as far as possible on the Managed server and signaling of the result of this processing back to the Admin server. The processing of the change information includes the necessary steps to ensure that the relevant files are available on the Managed server. This can either be an HTTP request [much like the FileDistribution servlet that is currently available] or a no-operation if the Admin server and the Managed servers share their file systems. Depending on the success of the processing of the change, the Managed server replies with an ACK or a NAK.

When the Admin server receives an ACK from all the servers that are specified in the scope of the update or if it receives a NAK from any of the servers, the two-phase update is aborted or an alert to the System Administrator is raised. The latter enables a System Administrator to over-ride and continue with the 'commit' phase of the update if he/she is sure that the lack of an acknowledgment from a server is harmless. This is likely to be used only when pushing changes to non-clustered servers. If the Admin server receives an ACK from every server in the scope, the change is 'commit'ted by incrementing the version id of the configuration and including it in subsequent heartbeats. Aborted updates are signaled explicitly with an 'abortTwoPhaseUpdate( )' call.

Further details regarding DRS replication are given in U.S. Provisional Patent Application entitled DATA REPLICATION PROTOCOL, Inventors Dean Bernard Jacobs, Reto Kramer and Ananthan Srinivasan, Application No. 60/305,986, filed Jul. 16, 2001, U.S. Provisional Patent Application entitled LAYERED ARCHITECTURE FOR DATA REPLICATION, Inventors Dean Bernard Jacobs, Reto Kramer and Ananthan Srinivasan, Application No. 60/305,978, filed Jul. 16, 2001, U.S. patent application entitled DATA REPLICATION PROTOCOL, Inventors Dean Bernard Jacobs, Reto Kramer and Ananthan Srinivasan , application Ser. No. 09/975,590, filed Oct. 11, 2001, and U.S. patent application entitled LAYERED ARCHITECTURE FOR DATA REPLICATION, Inventors Dean Bernard Jacobs, Reto Kramer and Ananthan Srinivasan, application Ser. No. 09/975,587, filed Oct. 11, 2001, which applications are incorporated herein by reference.

Application Deployment Control

Application deployment is coordinated and controlled using a number of supporting classes that interact directly with the DRS instead of going through the OA&M framework. This is in sharp difference to the traditional mechanisms for deployment that use the OA&M infrastructure. On the Admin server, the supporting classes use the MasterCoordinator interface exposed by the DRS, and implement the MasterCallbackHandler interface to react to the events raised by DRS. On the Managed servers, the classes use the SlaveCoordinator interface exposed by the DRS and implement the SlaveCallbackHandler interface to react to events raised by the DRS.

Application deployment and configuration management can modify the version of the configuration repository. To avoid inconsistencies, concurrent updates to the configuration repository are not allowed due to the constraints of DRS. All such updates will have to be serialized or synchronized on the identifier associated with the configuration data set.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application server environments may use and benefit from the invention. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for using a data replication service to consistently manage server configuration within a domain or cluster, comprising:
   a plurality of servers within the domain or cluster, each server comprising a configuration repository that defines the configuration information of the server as a plurality of configuration elements, and wherein the configuration repository has an updated-to version number associated therewith which is updated each time a change is made to the configuration of the server by adding, removing, or changing attributes of, one or more of the plurality of configuration elements;
   a master server within the plurality of servers that contains the configuration information including information about resources to be made available throughout the domain or cluster, said resources defined by the plurality of configuration elements;
   a master data replication service layer that recognizes changes made at the master server to one or more of the plurality of configuration elements and that sends from said master server, data replication packets defining the changes in the master server's configuration information, said data replication packets including the recognized changed one or more of the plurality of configuration elements, said data replication packets including both an initial-from version number, and an updated-to version number of the master server's configuration repository, together with the configuration information that changed between the initial-from version number and the updated-to version number;
   a slave data replication service layer that receives, at a slave server within the plurality of servers, the data replication packets from the master data replication service layer, and wherein the slave server determines whether the configuration information currently contained in the configuration repository at the slave server has been updated to correspond to the updated-to version number associated with a latest data replication packet received from the master server, and if the configuration information currently contained in the configuration repository at the slave server does not correspond to the updated-to version number, then the slave server requests a plurality of the data replication packets to be sent from said master server to said slave server, to match the undated-to version number at each server, including any intervening data replication packets, and wherein the slave server uses the data replication packets to update the configuration information at the slave server to match that of the master server, including adding, removing, or changing attributes of, the one or more plurality of configuration elements as necessary;
   wherein the system uses a two-phase process that comprises
      sending the data replication packet from the master server to a plurality of slave servers to prepare the slave servers,
      waiting for each slave server to prepare to commit the changes, including receiving and preparing class files from the master server for use in providing resources, and then responding to the master server with an acknowledgment,
      receiving the acknowledgment from each slave server, determining which of the slave servers have returned an acknowledgment, and then sending a commit from the master server to only those slave servers which have returned an acknowledgment, to commit the change to their configuration repository, and
      updating a naming directory interface at each of those slave servers advertising the availability of the resources for use within the domain or cluster.

2. The system of claim 1 wherein said configuration information can be changed as necessary or desired, and automatically replicated from said master server to said slave server, to converge consistency of the services as defined by the configuration elements within the entirety of the domain or the cluster.

3. The system of claim 1 wherein updates to said configuration information are packaged as incremental deltas of configuration data between subsequent configuration versions.

4. The system of claim 1 wherein said slave server is a one-phase sewer which can commit to new configuration information data as soon as it is received.

5. The system of claim 1 wherein the master server keeps track of the evolution of its configuration repository over time by maintaining a list of change tuples up to and including the current version of the configuration repository, and extending backwards from the current version to the version last known to have been successfully applied to all servers in the domain or cluster, and wherein a temporarily unavailable slave server is eventually provided with the configuration information updates by being served a list of change tuples from the slave server persistent repository version to either the desired or the current version of the repository, and wherein the slave server receives the list and performs a series of updates to its configuration repository to enable it to be made up to dare.

6. The system of claim 1 wherein, for each of a new element the data replication packet is in the form of a DOM tree snippet, and wherein each data replication packet includes a scaping element specifying the place where the change applies to the DOM tree, and wherein for a particular update said waiting includes waiting to receive an ACK from all of the slave servers that are specified in the scope of the update.

7. The system of claim 1 wherein the data replication packet is in the form of a name value pair matching an attribute name with a new value for that attribute.

8. A method for using a data replication service to consistently manage server configuration within a domain or cluster, comprising the steps of:
   providing a plurality of servers within the domain or cluster, each server comprising a configuration repository that defines the configuration information of the server as a plurality of configuration elements, and wherein the configuration repository has an undated-to version number associated therewith which is updated each time a change is made to the configuration of the server by adding, removing, or changing attributes of, one or more of the plurality of configuration elements;
   maintaining, at a master server within the plurality of servers that contains the configuration information including information about resources to be made available throughout the domain or cluster, said resources defined by the plurality of configuration elements;
   recognizing changes made at the master server to one or more of the plurality of configuration elements;
   sending data replication packets from said master server to a slave server, said data replication packets defining changes in the master server's configuration information, said data replication packets including the recognized changed one or more of the plurality of configuration elements, said data replication packets further including both an initial-from version number, and an updated-to version number of the master server's configuration repository, together with the configuration information that changed between the initial-from version number and the updated-to version number;

receiving data replication packets at said slave server; and determining whether the configuration information currently contained in the configuration repository at the slave server has been updated to correspond to the undated-to version number associated with a latest data replication packet received, and if the configuration information currently contained in the configuration repository at the slave server does not correspond to the undated-to version number then requesting a plurality of the data replication packets to be sent from said master server to said slave server, to match the undated-to version numbers at each server, including any intervening data replication packets, and wherein the slave server uses the data replication packets to update the configuration information at the slave server to match that of the master server, including adding, removing, or changing attributes of, the one or more plurality of configuration elements as necessary;

wherein the method uses a two-phase process that comprises sending the data replication packet from the master server to a plurality of slave servers to prepare the slave servers, waiting for each slave server to prepare to commit the changes, including receiving and preparing class files from the master server for use in providing resources, and then responding to the master server with an acknowledgment, receiving the acknowledgment from each slave server, determining which of the slave servers have returned an acknowledgment, and then sending a commit from the master server to only those slave servers which have returned an acknowledgment, to commit the change to their configuration repository, and updating a naming directory interface at each of those slave servers advertising the availability of the resources for use within the domain or cluster.

9. The method of claim 8 wherein said configuration information can be changed as necessary or desired, and automatically replicated from said master server to said slave server, to converge consistency of the services as defined by the configuration elements within the entirety of the domain or the cluster.

10. The method of claim 8 wherein updates to said configuration information are packaged as incremental deltas of configuration data between subsequent configuration versions.

11. The method of claim 8 wherein said slave server is a one-phase server which can commit to new configuration information data as soon as it is received.

12. The method of claim 8 wherein the master server keeps track of the evolution of its configuration repository over time by maintaining a list of change tuples up to and including the current version of the configuration repository, and extending backwards from the current version to the version last known to have been successfully applied to all servers in the domain or cluster, and wherein a temporarily unavailable slave server is eventually provided with the configuration information updates by being served a list of change tuples from the slave server persistent repository version to either the desired or the current version of the repository, and wherein the slave server receives the list and performs a series of updates to its configuration repository to enable it to be made up to date.

13. The computer readable medium of claim 8 wherein the master server keeps track of the evolution of its configuration repository over time by maintaining a list of change tuples up to and including the current version of the configuration repository, and extending backwards from the current version to the version last known to have been successfully applied to all servers in the domain or cluster, and wherein a temporarily unavailable slave server is eventually provided with the configuration information updates by being served a list of change tuples from the slave server persistent repository version to either the desired or the current version of the repository, and wherein the slave server receives the list and performs a series of updates to its configuration repository to enable it to be made up to date.

14. A computer readable medium, including instructions stored thereon which when executed cause the computer to perform the steps of:

providing a plurality of servers within the domain or cluster, each server comprising a configuration repository that defines the configuration information of the server as a plurality of configuration elements, and wherein the configuration repository has an undated-to version number associated therewith which is updated each time a change is made to the configuration of the server by adding, removing, or changing attributes of, one or more of the plurality of configuration elements;

maintaining, at a master server within the plurality of servers that contains the configuration information including information about resources to be made available throughout the domain or cluster, said resources defined by the plurality of configuration elements;

recognizing changes made at the master server to one or more of the plurality of configuration elements;

sending data replication packets from said master server to a slave server, said data replication packets defining the changes in the master server's configuration information, said data replication packets including the recognized changed one or more of the plurality of configuration elements, said data replication packets further including both an initial-from version number, and an updated-to version number of the master server's configuration repository, together with the configuration information that changed between the initial-from version number and the updated-to version number;

receiving data replication packets at said slave server; and determining whether the configuration information currently contained in the configuration repository at the slave server has been updated to correspond to the undated-to version number associated with a latest data replication packet received, and if the configuration information currently contained in the configuration repository at the slave server does not correspond to the undated-to version number then requesting a plurality of the data replication packets to be sent from said master server to said slave server, to match the updated-to version numbers at each server, including any intervening data replication packets, and wherein the slave server uses the data replication packets to update the configuration information at the slave server to match that of the master server, including adding, removing, or changing attributes of, the one or more plurality of configuration elements as necessary;

wherein the computer readable medium further comprises instructions to perform the steps of sending the data replication packet from the master server to a plurality of slave servers to prepare the slave servers, waiting for each slave server to prepare to commit the changes, including receiving and preparing class files from the master server for use in providing resources, and then responding to the master server with an acknowledgment, receiving the acknowledgment from each slave server, determining which of the slave servers have returned an acknowledgment, and then sending a commit from the master server to only those slave servers which have returned an acknowledgment, to commit the change to their configuration repository, and updating a naming directory interface at each of those slave servers advertising the availability of the resources for use within the domain or cluster.

15. The computer readable medium of claim 14 wherein said configuration information can be changed as necessary or desired, end automatically replicated from said master server to said slave server, to converge consistency of the services as defined by the configuration elements within the entirety of the domain or the cluster.

16. The computer readable medium of claim 14 wherein updates to said configuration information are packaged as incremental deltas of configuration data between subsequent configuration versions.

17. The computer readable medium of claim 14 wherein said slave server is a one-phase server which can commit to new configuration information data as soon as it is received.

* * * * *

UNITED STATES PATENT AND TRADEMARK OFFICE
CERTIFICATE OF CORRECTION

PATENT NO. : 7,617,289 B2
APPLICATION NO. : 10/371247
DATED : November 10, 2009
INVENTOR(S) : Srinivasan et al.

It is certified that error appears in the above-identified patent and that said Letters Patent is hereby corrected as shown below:

On the title page,

Item ( * ) Notice: Subject to any disclaimer, the term of this patent is extended or adjusted under 35 U.S.C. 154(b) by 853 days.

Delete "853 days", insert -- 1175 days --.

On the title page, Item (56), under "Other Publications", line 1, delete "0S/390" and insert -- OS/390 --, therefor.

On the title page, on page 2, Item (56), under "Other Publications", line 11, delete "Marinescu" and insert -- Marinescu, --, therefor.

In column 3, line 11, delete "data]" and insert -- data]. --, therefor.

In column 3, line 54, delete "updates i.e." and insert -- updates- i.e. --, therefor.

In column 5, line 18, delete "data managed" and insert -- data-managed --, therefor.

In column 6, line 7, delete "information" and insert -- information. --, therefor.

In column 7, line 5, delete "coordinated" and insert -- co-ordinated --, therefor.

In column 9, line 56, delete "'commit'ted" and insert -- 'committed' --, therefor.

In column 11, line 46, in claim 1, delete "undated-to" and insert -- updated-to --, therefor.

In column 12, line 16, in claim 4, delete "sewer" and insert -- server --, therefor.

In column 12, line 30, in claim 5, delete "dare." and insert -- date. --, therefor.

Signed and Sealed this

Seventh Day of September, 2010

David J. Kappos
*Director of the United States Patent and Trademark Office*

CERTIFICATE OF CORRECTION (continued)
U.S. Pat. No. 7,617,289 B2

In column 12, line 31, in claim 6, delete "element" and insert -- element, --, therefor.

In column 12, line 34, in claim 6, delete "scaping" and insert -- scoping --, therefor.

In column 12, line 48, in claim 8, delete "undated-to" and insert -- updated-to --, therefor.

In column 12, line 61, in claim 8, after "defining" insert -- the --.

In column 13, line 8, in claim 8, delete "undated-to" and insert -- updated-to --, therefor.

In column 13, line 12, in claim 8, delete "undated-to" and insert -- updated-to --, therefor.

In column 13, line 14, in claim 8, delete "undated-to" and insert -- updated-to --, therefor.

In column 14, line 22, in claim 14, delete "undated-to" and insert -- updated-to --, therefor.

In column 14, line 49, in claim 14, delete "undated-to" and insert -- updated-to --, therefor.

In column 14, line 53, in claim 14, delete "undated-to" and insert -- updated-to --, therefor.